May 23, 1967  H. E. RIORDAN ET AL  3,320,819
GYRO INDEXING MECHANISM

Filed Dec. 26, 1963  5 Sheets-Sheet 1

HUGH E. RIORDAN
VINCENT R. VENTO
RICHARD C. OSTROWE
*INVENTORS*

BY

*Thomas W. Kennedy*
ATTORNEY

HUGH E. RIORDAN
VINCENT R. VENTO
RICHARD C. OSTROWE
INVENTORS

BY

Thomas W. Kennedy
ATTORNEY

HUGH E. RIORDAN
VINCENT R. VENTO
RICHARD C. OSTROWE
*INVENTORS*

BY

Thomas W. Kennedy
ATTORNEY

May 23, 1967  H. E. RIORDAN ETAL  3,320,819
GYRO INDEXING MECHANISM

Filed Dec. 26, 1963  5 Sheets-Sheet 5

HUGH E. RIORDAN
VINCENT R. VENTO
RICHARD C. OSTROWE
*INVENTORS*

BY

Thomas W. Kennedy
ATTORNEY

United States Patent Office 3,320,819
Patented May 23, 1967

3,320,819
GYRO INDEXING MECHANISM
Hugh E. Riordan, Wyckoff, Vincent R. Vento, Morris Plains, and Richard C. Ostrowe, Wayne, N.J., assignors to General Precision Inc., Little Falls, N.J., a corporation of Delaware
Filed Dec. 26, 1963, Ser. No. 333,346
5 Claims. (Cl. 74—5.34)

This invention relates to gyroscopic stable platforms and more particularly to a gyro unit mounted thereon.

In a conventional stable platform a cluster of gyros are mounted within the platform gimbals. The gyro outputs control the gimbals by means of a servo loop; and auxiliary power is available to drive the gimbals. In such a platform using single-degree-of-freedom gyros, three such gyros are mounted together, with their input axes forming a mutually orthogonal triad. Each gyro has a gimbal servo system which maintains its corresponding gyro axis fixed in space.

In this type of stable platform there are three gimbals. The innermost gimbal or table is called the azimuth, heading or yaw gimbal and is free to move about its heading axis. The intermediate gimbal is called the pitch gimbal and is free to move about its pitch axis. The outermost gimbal is called the roll gimbal and is free to move about its roll axis. The outermost gimbal is pivotally mounted in a case which is fastened to a vehicle, such as a submarine or ship. The innermost, azimuth gimbal or table has the three gyro units mounted thereon. The three gyros are positioned on the table so that their input axes correspond to the azimuth, pitch and roll axes of the vehicle. Each gyro unit, such as in a rate integrating type of gyro, has three of its own axes in quadrature, that is, its rotor axis about which its rotor turns, its input axis, and its output or precession axis.

This invention is particularly useful in connection with the above type of stable platform, although as will become apparent, this invention is not limited to this specific type of platform.

Prior platform tables of the above type are known to be subject to drift errors. The output of any rate integrating gyro consists of the sum of the response of the gyro to real angular rate inputs (such as earth's rate) and its response to error torques originating within tht gyro. Typical causes of such error torques are:

(1) Stiffness of flexible leads conducting current to the motor.
(2) Friction in the pivot and jewel which locates the float.
(3) Magnetic forces acting between the motor and its surroundings.
(4) Stray electromagnetic reaction torques produced by the torquer and pickoff.

In a gyro having a vertical oriented axis, all of the above torques except the friction torque may be regarded as "case fixed." That is, they produce an apparent error which is always in the same sense regardless of how the gyro is rotated about its vertical oriented axis. The friction torque is random in nature and not predictable except by statistical analysis.

A platform carrying a gyro having a vertical oriented axis, map be oriented so that it is aligned with true north by rotating it about the vertical axis until the component of earth's rate indicated by one of the vertical oriented gyros is zero. The spin axis of the gyro being used as a reference is then (within a certain error) aligned in a plane containing earth's axis (i.e., it is aligned with the true north).

The accuracy of this alignment is determined by the magnitude of the gyro errors produced by the error torques as described previously. Since the component of the output of the gyro due to earth's rate reverses if the gyro is rotated about a vertical axis through an angle of 180° while the direction of the error torques does not, we may separate out and correct for errors in the indicated north produced by the error torques.

If we represent the output of the gyro by E, the angular momentum by H, the sum of the error torques by T, and earth's rate by $\Omega_o \cos \lambda \sin \theta$ (where $\lambda$ is the latitude angle and $\theta$ the angle between the spin axis and true north), we may write two equations representing the output of the gyro in the nominal and 180° orientations:

$$E_o = \Omega_o \cos \lambda \sin \theta + \frac{T}{H}$$

$$E_{180} = -\Omega_o \cos \lambda \sin \theta + \frac{T}{H}$$

subtracting these two equations, we obtain:

$$(E_o - E_{180}) = \left[\Omega_o \cos \lambda \sin \theta + \frac{T}{H}\right] - \left[-\Omega_o \cos \lambda \sin \theta + \frac{T}{H}\right]$$

so that:
$$(E_o - E_{180}) = 2\Omega_o \cos \lambda \sin \theta$$

and $$\theta = \arc \sin \left[\frac{(E_o - E_{180})}{2\Omega_o \cos \lambda}\right]$$

Thus, we see that the heading of the gyro relative to true north may be obtained accurately, since the error terms cancel out.

The accuracy of this determination of north is determined by the accuracy with which the gyro can be rotated through the 180° angle, and the predictability and magnitude of the friction torque. In a gyro of good quality the friction is sufficiently small that the accuracy of orientation is the governing consideration.

For additional information regarding employment of the present invention reference may be had to the following co-pending applications for U.S. Letters Patent, assigned to the same assignee as the present invention: Ser. No. 31,741, filed May 25, 1960, now Patent No. 3,222,795, by James C. Gevas and entitled, "Accelerated North-Seeking Gyro-Compassing System"; and Ser. No. 164,535, filed Jan. 5, 1962, now Patent No. 3,206,864, by Neil A. Sanchirico et al. and entitled, "Method and System for Rapidly Determining True North at any Latitude on the Earth's Surface."

In accordance with the present invention a gyro indexing mechanism is provided which rotates and accurately positions a gyro unit about its precession axis for taking drift measurements before and after reversal of the input vector.

Accordingly, it is one object of the invention to eliminate gyro drift errors in a stable platform.

It is another object of the invention to provide a redundant gyro unit having a gyro indexing mechanism for reversing the gyro input vector for determining and calibrating for gyro drift errors without interrupting platform intelligence.

It is a further object of the invention to provide an indexing mechanism for a navigation device for reversing an axis of the device relative to a corresponding axis of the mechanism with a high accuracy in the order of 10 seconds of arc per reversal.

To the fulfillment of these and other objects, the invention provides a gyro indexing means in combination with a gyro unit having an axis, said gyro indexing means supporting the gyro unit and rotating the gyro unit about said gyro axis comprising: an outer body coaxial with the gyro; an inner body supported by said outer body, rotatable relative to said outer body, coaxial with said outer body and gyro, and supporting the gyro for joint rotation with the gyro; and driving means engaging said outer body and said inner body to rotate said inner body about said gyro axis, relative to the outer body in prescribed angular movements.

Further objects and advantages of the present invention will become readily apparent from the following detailed description of a specific embodiment of the invention, taken in conjunction with the drawings, wherein.

Figure 1:
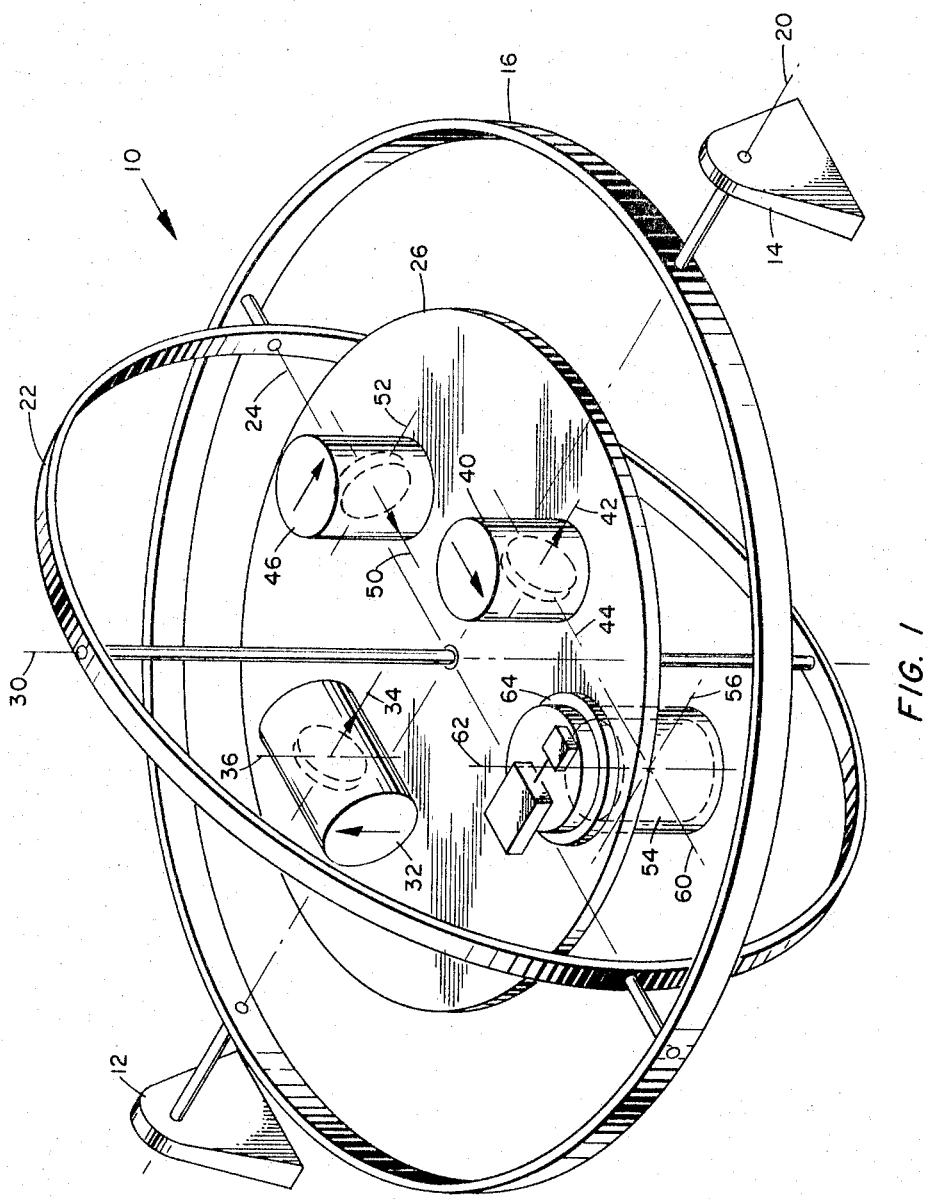
FIGURE 1 is a perspective, schematic view of a platform table embodying features of the present invention.

Referring to FIGURE 1, one embodiment of the present invention is used in a conventional stable platform 10. Such a platform 10 may be mounted in a vehicle, such as a submarine or ship, and its casing usually has pivots 12, 14 for pivotally supporting the outermost or roll gimbal 16 about the roll axis 20. The platform 10 also has an intermediate or pitch gimbal 22 which is pivotally supported about the pitch axis 24, and has an innermost gimbal, which is called the heading or azimuth or yaw gimbal, which is pivotally supported about the heading axis 30. The heading gimbal 26 is also referred to as a platform table. This type of three-gimbal platform usually has three single-degree-of-freedom gyro units, including the heading gyro unit 32 having spin axis, the pitch gyro unit 40 having spin axis 42 and the roll gyro unit 46 having spin axis 50. The heading gyro 32 has an input axis 36, which is parallel to the heading gimbal axis 30; the pitch gyro unit 40 has an input axis 44, which is parallel to the pitch gimbal axis 24; and the roll gyro unit 46 has an input axis 52, which is parallel to the roll gimbal axis. Stable platform 10, as described thus far, is of a well-known type, and is only one of a large variety of platform types. With this type stable platform 10, it is preferable if the platform intelligence is not interrupted, and at the same time it is desirable that the vertical gyro drift errors be determined and the platform 10 be concurrently calibrated.

For this purpose, the stable platform 10 in accordance with the invention has a redundant gyro unit 54 having a rotor or spin axis 56 and an input axis 60. Redundant gyro 54 is used to find the drift error of the stable platform 10, which is a combination of the drift errors in the pitch gyro 40 and the roll gyro 46. In this embodiment, the precession axes of both the pitch gyro 40 and the roll gyro 46 are arranged substantially at right angles to the table gimbal 26. Therefore, the redundant gyro 54 has a precession axis 62, which is also substantially at right angles to the platform table gimbal 26, and parallel to said precession axes of the pitch gyro 40 and roll gyro 46. Redundant gyro 54 has an indexing mechanism 64, which can rotate the redundant gyro 54 through a 180° angle and back again to its original position, whereby a drift error measurement can be taken at each position so that the calculated gyro drift error would amount to one-half the algebraic sum of the drift measurements. It is therefore necessary that the indexing mechanism 64 be able to rotate redundant gyro 54 relative to gimbal table 26.

Figure 2:
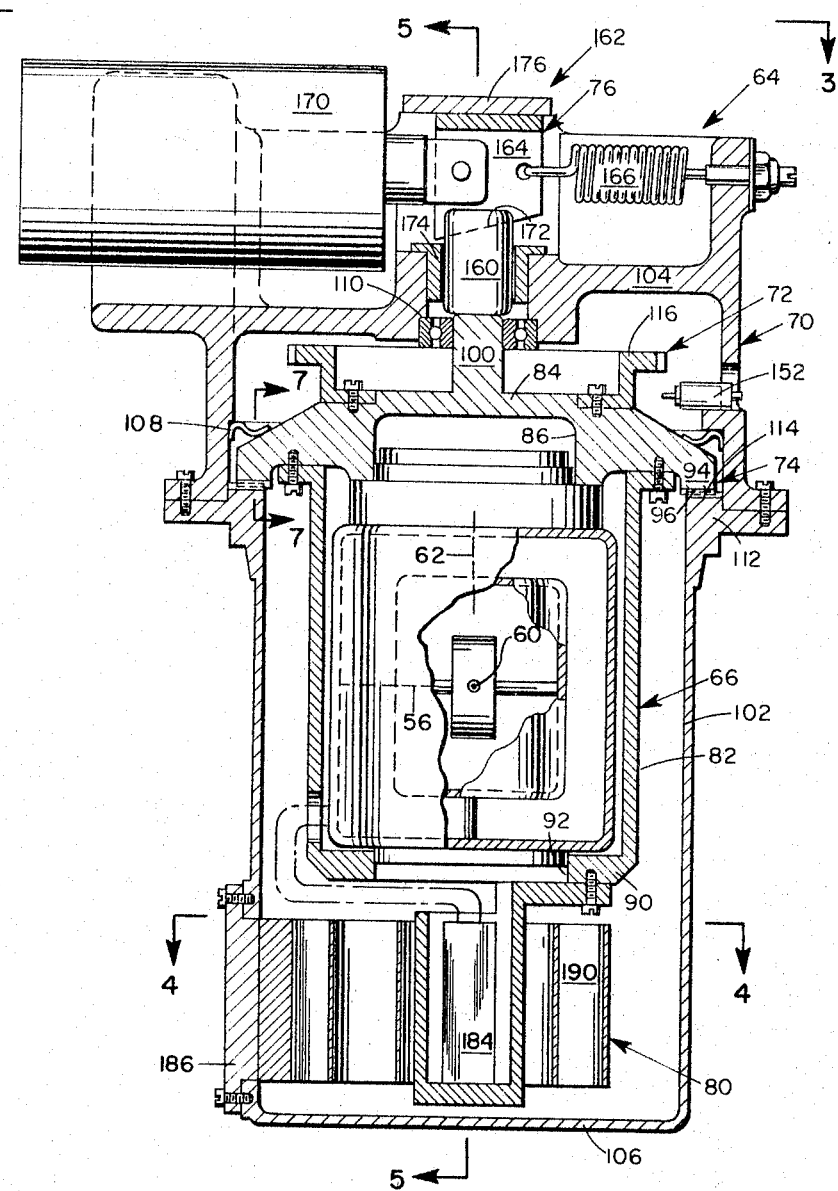
FIGURE 2 is a vertical sectional view through the redundant gyro unit illustrated in FIGURE 1.
Figure 3:
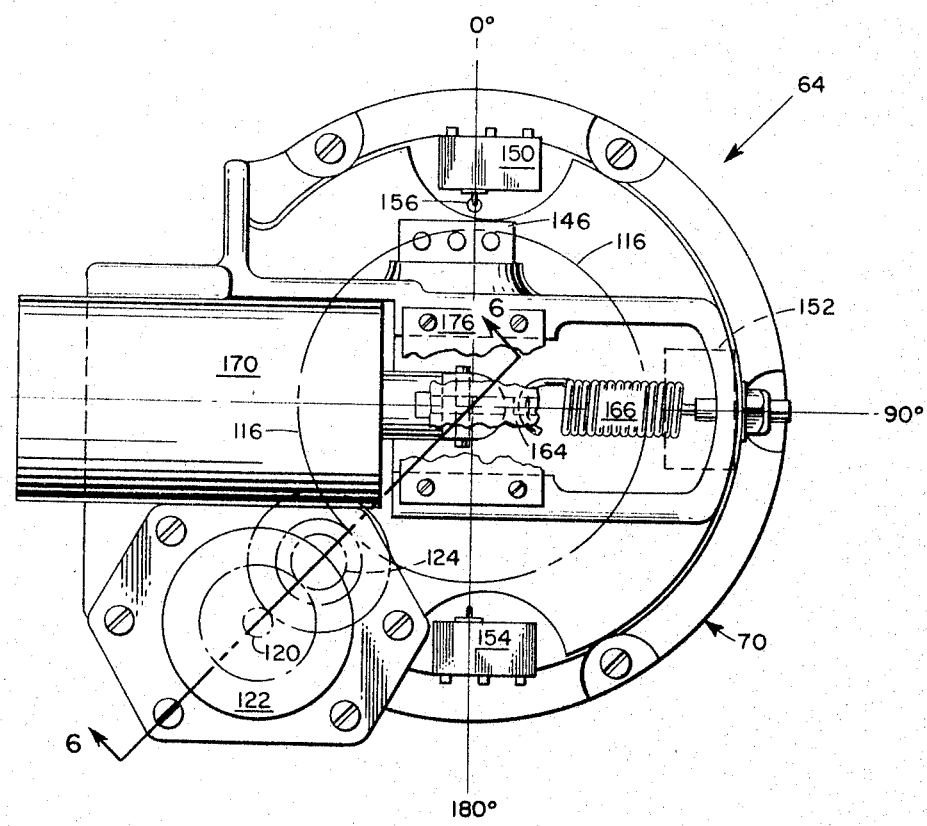
FIGURE 3 is a plan view of the gyro unit taken along line 3—3 of FIGURE 2.
Figure 4:
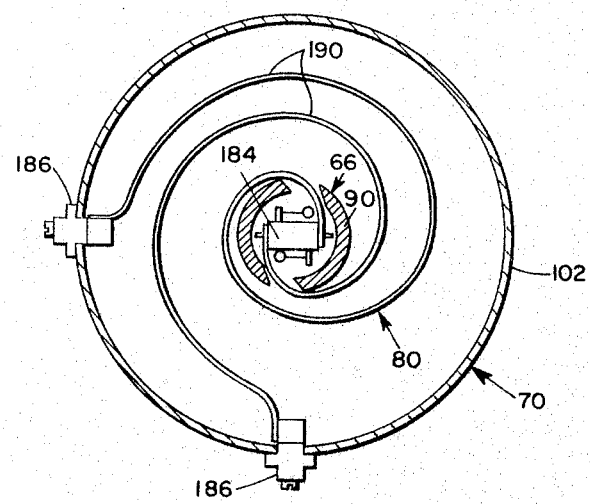
FIGURE 4 is a sectional view taken along line 4—4 of FIGURE 2.
Figure 7:
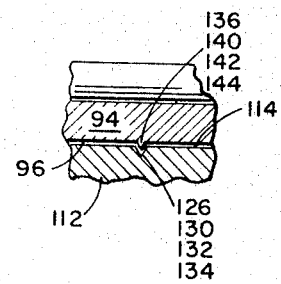
FIGURE 7 is a sectional view taken along line 7—7 of FIGURE 2.

Referring to FIGURES 2 and 3, gyro indexing mechanism 64 in the illustrated embodiment of the invention has an outer body 70 which is fixedly connected to heading gimbal-table 26, and has an inner body 66 which rotates about its precession axis 62 relative to said outer body 70 and said table 26. Indexing mechanism 64 also has drive means 72 for rotating inner body 66 relative to outer body 70. Indexing mechanism 64 also has positioning means 74 to adjust the relative angular position and align the axes of inner body 66 relative to outer body 70. The indexing mechanism 64 also has locking means 76 which normally holds inner body 66 in a safe or lock position relative to outer body 70, and improves the accuracy of positioning means 74. Moreover, the indexing mechanism 64 has separate electrical conductor means 80 connecting the relatively movable inner body 66 and outer body 70 for carrying the signals from the redundant gyro unit 54 to terminals in the exterior surface of the indexing mechanism 64. Redundant gyro 54, as mentioned before, is preferably a rate integrating gyro of a single-degree-of-freedom type; and is encased within inner body 66.

Inner body 66 is coaxial with redundant gyro 54 along its precession axis 62. Inner body 66 has a peripheral wall 82, an upper end wall 84, and a lower end wall 90 forming an enclosure in which said gyro unit 54 is received. Upper wall 84 is preferably removable; lower wall 90 is preferably integral with peripheral wall 82 for ease of assembling said gyro unit 54 therein. Upper wall 84 has a recess 86 on its inner face, and lower wall 90 has a corresponding recess on its inner face in which the end portions of gyro unit 54 are respectively received for positioning said gyro unit 54 coaxially with inner body 66 along its precession axis 62, and preventing relative movement therebetween. Peripheral wall 82 has an exterior ring portion projecting radially outwardly from said peripheral wall adjacent one end thereof, preferably the upper end, preferably forming a ring flange 94. Ring flange 94 has a bearing surface 96 on its axially inner side, which is in a plane substantially at right angles to the inner body axis and precession axis 62. Inner body 66 also has a pivot shaft 100 with one end thereof fixedly connected to the outer face of upper end wall 84 and axially projecting outwardly therefrom. Pivot shaft 100 is coaxial with inner body axis and precession axis 62.

Outer body 70 also has a peripheral wall 102, and an upper end or cap wall 104, and a lower end wall 106 forming a cavity which receives inner body 66. Peripheral wall 102 is preferably cylindrical and concentric with the peripheral wall 82 of the inner body 66. Cap wall 104 is preferably removable, being connected to peripheral wall 102 by bolts, or the like. Lower end wall 106 is preferably integral with peripheral wall 102.

Cap wall 104 has a sealing ring 108 mounted on its radially inner face, the seal ring 108 having a radially inner edge in sealing engagement with the axially outer face of upper end wall 84 of inner body 66 to help in preventing the entrance of vapor or dust particles therethrough.

Cap wall 104 has a bearing portion 110 in which pivot shaft 100 is journaled. Bearing portion 110 is coaxial with outer body 70, both being substantially coaxial with pivot shaft axis and precession axis 62. In this way, inner body 66 is positioned in a radial direction relative to outer body 70, maintaining the inner body axis along the outer body axis. Peripheral wall 102 has an annular shoulder portion 112 protruding radially inwardly from its inner surface adjacent the ring flange 94. Annular shoulder 112 has a bearing face 114 opposite the ring flange bearing face 96. Shoulder bearing face 114 is in a plane substantially parallel to the plane of ring flange bearing face 96, and is substantially at right angles to gyro precession axis 62. Shoulder bearing face 114 is normally in overlapping engagement with ring flange bearing face 96 whereby inner body 66 is supported by outer body 70 in their normally vertical position on the platform 10.

Figure 6:
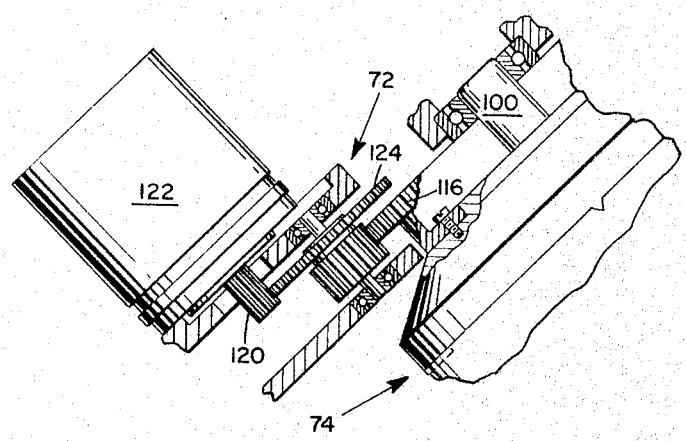
FIGURE 6 is a sectional view taken along line 6—6 of FIGURE 3.
Figure 5:
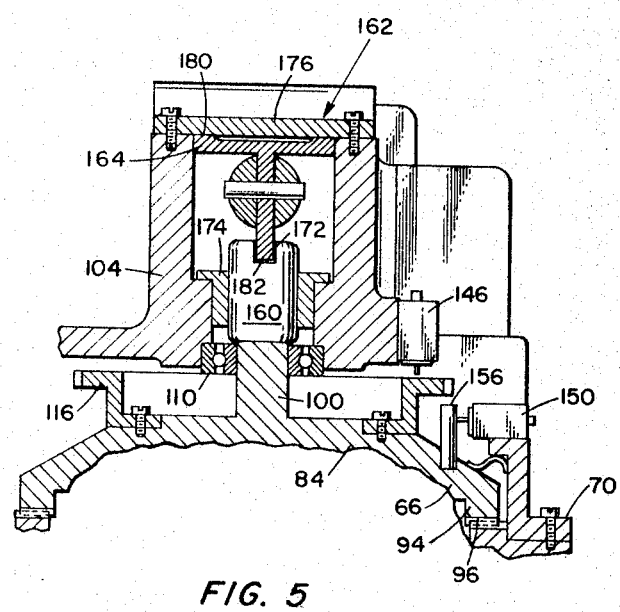
FIGURE 5 is a sectional view taken along line 5—5 of FIGURE 2.

Drive means 72 includes a ring gear 116 mounted on the inner body 66, which is driven by a motor 122 mounted on the outer body. Motor 122 has a pinion gear 120 integral coaxially with its drive shaft. Drive means 72 preferably also includes gear reduction means 124 disposed between ring gear 116 and pinion gear 120, which is also mounted on outer body 70 and engages said gears 116 and 120. Gear reduction means 124 preferably is a conventional type, such as a large diameter gear for engaging the drive pinion gear, and a small diameter gear engaging the driven ring gear 116, said reduction gears preferably being integrally mounted on a common hub which is free to rotate on a shaft mounted at one end on the outer body, as illustrated in FIGURE 6. Ring gear 116 is preferably mounted on the axially outer face of the upper end wall 84 of inner body 66, by bolts, or the like, and is coaxial with inner body 66 along precession axis 62. In addition, ring gear 116 is disposed axially inwardly of outer body cap wall 104. Cap wall 104 has an irregular shape preferably being a casting for this purpose, and having a recessed portion on its axially outer side in which gear reduction means 124 is received for engagement with ring gear 116 which extends through said recess. As mentioned before inner body 66 is positioned radially at pivot shaft 100, and positioned axially at flange face 96, and in addition inner body 66 is rotated by drive means 72 relative to outer body 70.

Positioning means 74 are provided for two reasons; first, to adjust the angular position of the inner body relative to the outer body, and second, to assure that the axes of the inner body and the outer body are in accurate alignment. For this purpose, shoulder face 114 has a plurality of grooves or detents 126, 130, 132, 134, and flange face 96 has a plurality of teeth or latches 136, 140, 142, 144. The number of teeth corresponds to the number of grooves. There are preferably four grooves, as indicated, but never less than three grooves. The grooves are arranged to be spaced 90° apart, and the teeth have a corresponding equiangular spacing. Each groove is preferably a V-notch type of groove. Grooves 126, 130, 132, 134 are arranged radially so that a line passing through a pair of opposite grooves also passes through the outer body axis, and the teeth 136, 140, 142, 144 are similarly arranged with reference to the inner body axis or precession axis 62. Thus, the inner body 66 can be accurately positioned relative to the outer body 70 in any one of four positions, which are substantially 90° apart. In this embodiment, the inner body 66 can be rotated in a reverse position from an original 0° position to a final 180° position, in two 90° steps. With this type of positioning means 74, the inner body 66 can be aligned with the outer body 70 both in an axial direction and in an angular direction, with extremely high accuracy, even though there may be some play between the pivot shaft 100 and its bearing 110. In addition, such accuracy can be maintained, even though shoulder face 114 and flange face 96 are not exactly parallel, and have a gap therebetween at all times.

Outer body cap wall 104 supports a motor control switch 146, which is disposed adjacent to inner body ring gear 116. At the time inner body 66 is rotated from a position in which teeth 136, 140, 142, 144 are received in their respective grooves to a position just after said teeth leave said grooves, said inner body 66 is displaced slightly in an axial direction. When inner body 66 is displaced in this manner, ring gear 116 engages motor control switch 146 and thereby reduces the drive torque of motor 122. In this way, drive means 72 furnishes a driving torque which is approximately proportional to the resisting torque, that is a higher drive torque when said teeth are leaving their corresponding grooves, and a lower drive torque between said grooves. Such a motor control switch or low torque switch 146 is preferably used in order to provide inner body 66 with an approximately constant rotary speed during said movements.

Outer body cap wall 104 also has position programming switches or position sensing switches 150, 152, 154, which are located in this embodiment at 0° detent, 90° detent and 180° detent, respectively. Inner body upper end wall 84 has a fixed pin 156 projecting axially outwardly for engagement with said sensing switches when adjacent thereto. In this way, the position of inner body 66 relative to outer body 70 is indicated by said switches 150, 152, 154.

Locking means 76 preferably includes a plunger 160, which bears against the axially outer face of pivot shaft 100, and a T-shaped wedge 164, which causes the plunger 160 to axially displace inner body 66 in an inward direction preventing relative movement between inner body 66 and outer body 70. Cap wall 104 has a U-shaped portion 162, which retains wedge 164 in position, for engagement of wedge 164 and plunger 160. Locking means 76 preferably has, in addition, a tension spring 166 connected to one side of wedge 164, which normally holds said wedge 164 against movement in a transverse direction. Wedge 164 urges plunger 160 in an axial direction against pivot shaft 100, holding inner body 66 normally in a locked position. Locking means 76 also has a solenoid 170 at the opposite side of wedge 164 connected thereto, which, when energized, moves wedge 164 in a transverse direction, away from spring 166, thereby releasing inner body 66.

Plunger 160 has a groove 172 in its axially outer face receiving wedge 164 to maintain plunger 160 in position relative thereto. Plunger groove 172 has a bottom surface which slopes so that the groove 172 is deeper at one end than the other end, and plunger 160 is preferably made of phosphor bronze material, so that wedge 164, when displaced transversely, can urge plunger 160 axially inwardly with a minimum amount of friction. Cap wall 104 has a bushing, which receives plunger 160, permitting axial movement of said plunger therein.

The U-shaped wall portion 162, forming an enclosure around wedge 164 is composed of a pair of flange-like walls, one on each side of plunger 160, being integral with cap wall 104, and, in addition, a web-like wall or bearing plate extending transverse to said flange-like walls and to precession axis 62. Said bearing plate 176 has an axially inward side engaging the axially outer side of wedge 164, and preferably composed of phosphor bronze material for ease of movement of wedge 164. Wedge 164 is preferably T-shaped so that its outer face 180 bears against bearing plate 176 and its axially inner edge 182 bears against the bottom surface of plunger groove 172. In this way, spring 166 normally pulls wedge 164 transversely, holding wedge 164 in bearing against plunger 160, locking inner body 66. In addition, if solenoid 170 fails, inner body 66 is normally in a safe position or lock position. Solenoid 170 can retract wedge 164 when it is activated whereby inner body 66 can rotate between angular positions.

Electrical conductor means 80 includes an inner body terminal 184 mounted on an axially outwardly projecting portion of lower end wall 90 of inner body 66, and an outer body terminal 186 mounted on peripheral wall 102 of outer body 70. Said terminals 184, 186 are connected by a flexible cable 190 which allows inner body 66 to rotate through at least a full revolution relative to outer body 70. Such conductor means 80 is preferred in this embodiment where the inner body 66 need only rotate through a 180° angle and then reverse direction to rotate back to its original angular position, because of the ease of manufacture of this type of conductor means. Flexible cable 190 is a conventional type, composed of a plurality of substantially parallel wires with a layer of tape on each side of said wires.

Positioning means 74 provides a high degree of accuracy in the angular positioning and the axial alignment of inner body 66 relative to outer body 70. Locking means 76 improves the accuracy of positioning means 74 by applying an axial parallel force on each detent and its complementary tooth. Moreover, locking means 76 greatly improves the accuracy of positioning means 74 in a vibration environment.

This type of indexing mechanism 64 can be combined with various types of programming systems. In this embodiment, the inner body 66 and its gyro unit 54, which is, as mentioned before, the redundant gyro on the stable platform 10, are preferably rotated through a 180° angle, and after a drift error reading is obtained, reversed and rotated back to their original 0° position where a second reading is obtained.

The operating sequence for rotating said inner body 66 and its gyro unit 54 from the 0° position to a 180° position is preferably as follows:

(1) In its initial condition, the inner body 66 and its gyro unit 54 are held in a 0° position by spring 166 and wedge 164. Solenoid 170 is unenergized, and the position of inner body 66 is indicated by 0° detent switch 150.

(2) Solenoid 170 is externally energized, retracting wedge 164 and thereby unlocking inner body 66.

(3) Voltages are then applied across a voltage divider (not shown). With low-torque motor switch 146 in its normally open position, the full voltage is applied across servo motor 122, causing inner body 66 to be driven up and out of detents 126, 130, 132, 134.

(4) As inner body 66 leaves detents 126, 130, 132, 134, low-torque motor switch 146 is actuated, reducing the motor voltage to that across one leg of the voltage divider (not shown). Inner body 66 is then driven preferably at the rate of about 10° per second until it drops into the next position of said detents.

(5) In this position, inner body 66 actuates first the 90° detent switch 152, and then de-actuates the low-torque motor switch 146. The latter operation of switch 146 causes full voltage to be applied to the servo motor 122, and the rotation cycle through 90° is repeated.

(6) In the 180° position, detent switch 154 is actuated to signal the de-energization of the motor circuit and of the solenoid 170.

(7) The spring force transmitted through wedge 164 and plunger 160 thereupon acts to center and lock inner body 66 in detents 126, 130, 132, 134. Gyro unit measurements can then be taken in the 180° position.

(8) In this embodiment, inner body 66 is subsequently caused to return to 0° position in a reverse rotational direction, following a similar operating sequence.

There are alternate details of construction which may be used with this embodiment illustrated in FIGURES 1–7. For example, the V-shaped teeth 136, 140, 142, 144 used with the V-notched grooves 126, 130, 132, 134 can be modified by using either a bearing ball or a circular pin, in place of each V-shaped tooth in this particular detail; and this modification may cause indexing mechanism 64 to achieve greater accuracy in the positioning of inner body 66 relative to outer body 70. A second modification, which may be made to one part of the indexing mechanism 64 previously described, would involve the replacement of flexible cable 190 with suitable slip rings, so that inner body 66 may be rotated always in the same direction, when turned to a 180° position and returned to its original 0° position. A third modification, which may be made to this embodiment, would involve the use of a spring-loaded thrust-bearing, or the like, for the bearing portion 110, which receives pivot shaft 100. This would provide spring means urging inner body 66 in an axial direction against outer body 70 at all times, so that inner body 66 could not be dislodged in any way, when unlocked, even if the platform 10 were overturned for some unusual reason.

There are additional applications for this type of indexing mechanism 64. One such application for the indexing mechanism 64 is in combination with an accelerometer. In such an assembly, the gyro unit 54 is replaced by an accelerometer unit, the latter being mounted within inner body 66 in a similar manner, except being arranged so that its acceleration axis is substantially at right angles to the common rotational axis 62 of inner body 66 and outer body 70 of the indexing mechanism 64. Such an assembly of an accelerometer unit and indexing mechanism 64 can then be used in a missile or rocket, with the acceleration axis of the accelerometer aligned with the longitudinal axis of the missile or rocket. In this way, the longitudinal axis or thrust axis of the vehicle is aligned with the acceleration axis of the accelerometer, both of which are substantially at right angles to the rotational axis of the indexing mechanism 64. Since the input to the accelerometer occurs along its acceleration axis, and since the output of the accelerometer consists of the response to said input with an added uni-directional error, by reversing the acceleration axis of the accelerometer by the use of the indexing mechanism 64, the value and sign of the error remains constant, but the input changes for purposes of measurement from a positive to a negative algebraic sign. The true input can then be determined as one-half the algebraic difference of the measurements made at the two positions of the acceleration axis since the error is thereby canceled. Thus, the indexing mechanism 64 in combination with an accelerometer can be used in such a vehicle to measure the true input unaffected by instrument error.

Another of such additional applications for indexing mechanism 64 is in factory testing of gyro units or accelerometer units. It is a normal testing procedure to measure outputs for such units at various orientations of such units; and said indexing mechanism 64 is very suitable for automatic testing procedures. In such a procedure, a number of inspection operations can be made on a gyro unit or accelerometer unit, when mounted in such an indexing mechanism 64. Such an indexing mechanism 64 can be easily combined with an automatic programming system to make the testing procedure automatic.

While the present invention has been described in detail in its present preferred embodiment, it will be obvious to those skilled in the art after understanding this invention that various changes and modifications may be made therein without departing from the spirit or scope thereof. It is intended by the appended claims to cover all such modifications.

What is claimed is:

1. In combination with a stable platform, a gyro indexing system for determining gyro drift errors including a rate integrating gyro unit having its precession axis substantially at right angles to said stable platform and an indexing mechanism for mounting said gyro unit and for rotating said gyro unit so that its input axis can be re-oriented comprising:

an outer body having an axis and being mounted with its axis at right angles to said stable platform;

an inner body having an axis and being surrounded by and rotatably supported by said outer body for rotation relative thereto and surrounding, being coaxial with, and supporting said gyro unit for joint rotation therewith;

positioning means between said inner body and said outer body to accurately align said inner body axis on said outer body axis at prescribed angular positions of said inner body relative to the outer body; and driving means engaging said outer body and said inner body to rotate said inner body relative to said outer body between said prescribed angular positions.

2. In combination with a vehicle, an accelerometer indexing system for determining accelerometer errors including an accelerometer having its input axis aligned with the acceleration axis of said vehicle, and an indexing mechanism for mounting said accelerometer and for rotating the accelerometer so that its input axis can be re-oriented comprising:
- an outer body maving an axis and being mounted with its axis at right angles to said acceleration axis of the vehicle;
- an inner body having an axis and being surrounded by and rotatably supported by said outer body for rotation relative thereto, and surrounding, being coaxial with, and supporting said accelerometer for joint rotation therewith;
- positioning means between said inner body and said outer body to accurately align said inner body axis on said outer body axis at prescribed angular positions of said inner body relative to the outer body; and
- driving means engaging said outer body and said inner body to rotate said inner body relative to the outer body between said prescribed angular positions.

3. In combination with a gravity sensing unit, an indexing mechanism for rotating the unit so that the input axis of the unit can be re-oriented comprising:
- an outer body having an axis and being adapted for mounting;
- an inner body having an axis and being surrounded by and rotatably supported by said outer body for rotation relative thereto, and surrounding, being coaxial with, and supporting said gravity sensing unit for joint rotation therewith;
- positioning means between said inner body and outer body to accurately align said inner body axis on said outer body axis at prescribed angular positions of said inner body relative to said outer body;
- driving means engaging said outer body and said inner body to rotate said inner body relative to said outer body between said prescribed angular positions; and,
- wherein said outer body has a peripheral wall with an annular shoulder on its radially inner surface;
- the inner body has a peripheral wall with a ring flange on its radially outer surface, which overlaps said annular shoulder;
- the shoulder having at least three radial V-notch grooves with equiangular spacing therebetween and disposed equidistant from said outer body axis; and
- the ring having the same quantity of tooth-like latch means with equiangular spacing therebetween and disposed equidistant from said inner body axis, which cooperate with said grooves at said prescribed angular positions of said inner body for centering said inner body and said outer body in coaxial alignment.

4. The combination as claimed in claim 3 and including locking means mounted on said outer body and engaging said inner body, the locking means being actuated at said prescribed positions of said inner body to urge said inner body in an axial direction and to urge each of said inner body latches to bear simultaneously against its adjacent outer body groove causing compressed seating of each latch in its groove for accurately aligning said axes and maintaining said alignment against external disturbance.

5. In a stable platform including a heading gimbal table having a heading axis, a pitch gimbal having a pitch axis and a roll gimbal having a roll axis, with the heading, pitch and roll axes being in quadrature;
- four single-degree-of-freedom gyros supported on the heading gimbal table with each gyro having a rotor axis, an input axis and an output axis in quadrature, including a first gyro oriented with its input axis substantially parallel to the platform heading axis, a second gyro oriented with its input axis substantially parallel to the platform pitch axis, a third gyro oriented with its input axis substantially parallel to the platform roll axis, and a fourth gyro having an indexing mechanism for adjusting the orientation of its input axis;
- said indexing mechanism comprising:
  - an outer body connected to the heading gimbal table and having an axis oriented substantially parallel to the platform heading axis,
  - an inner body being surrounded and rotatably supported by said outer body for rotation relative thereto, and surrounding and supporting said fourth gyro for joint rotation therewith and being coaxial with said fourth gyro along its gyro output axis,
  - positioning means between said inner body and said outer body to accurately align said inner-body gyro-output axis on said outer body axis at prescribed angular positions of said inner body relative to said outer body, and
  - driving means engaging said outer body and said inner body to rotate said inner body relative to said outer body between said prescribed angular positions.

References Cited by the Examiner

UNITED STATES PATENTS

| 2,390,596 | 12/1945 | Larson | 74—816 |
| 3,137,173 | 6/1964 | Farmer | 73—1 |
| 3,164,978 | 1/1965 | Sharman et al. | 73—1 |
| 3,222,795 | 12/1965 | Gevas | 33—226 |

FRED C. MATTERN, Jr., *Primary Examiner.*

J. PUFFER, *Assistant Examiner.*